United States Patent
Damdar et al.

(10) Patent No.: US 9,732,855 B2
(45) Date of Patent: Aug. 15, 2017

(54) EXTREME TEMPERATURE GASKET AND METHOD OF MAKING THE SAME

(75) Inventors: Sherwin Damdar, Rochester, NY (US); James Drago, Macedon, NY (US); Paul Jude Nichols, Fairport, NY (US)

(73) Assignee: GARLOCK SEALING TECHNOLOGIES, LLC, Palmyra, NY (US)

(*) Notice: Subject to any disclaimer, the term of this patent is extended or adjusted under 35 U.S.C. 154(b) by 1254 days.

(21) Appl. No.: 13/252,788

(22) Filed: Oct. 4, 2011

(65) Prior Publication Data

US 2012/0100459 A1    Apr. 26, 2012

Related U.S. Application Data

(60) Provisional application No. 61/405,038, filed on Oct. 20, 2010.

(51) Int. Cl.
*H01M 8/10* (2016.01)
*F16J 15/20* (2006.01)
(Continued)

(52) U.S. Cl.
CPC ............. *F16J 15/20* (2013.01); *H01M 8/10* (2013.01); *B32B 27/00* (2013.01); *F16J 15/064* (2013.01);
(Continued)

(58) Field of Classification Search
CPC ...... H01M 8/10; H01M 8/1004; H01M 4/926; H01M 4/8605; H01M 4/92;
(Continued)

(56) References Cited

U.S. PATENT DOCUMENTS

| 2,597,976 A | 5/1952 | Cousins |
| 3,158,526 A | 11/1964 | Farnam et al. |

(Continued)

FOREIGN PATENT DOCUMENTS

| CA | 2018857 A | 12/1990 |
| EP | 0402909 A1 | 12/1990 |

(Continued)

OTHER PUBLICATIONS

International Search Report and Written Opinion dated Nov. 30, 2011 for Int. Appl. No. PCT/US2011/024897, 8 pp.

(Continued)

*Primary Examiner* — Alex Usyatinsky
(74) *Attorney, Agent, or Firm* — Perkins Coie LLP

(57) ABSTRACT

An extreme temperature gasket material capable of withstanding temperatures in excess of 850° F. is provided. The extreme temperature gasket generally includes an inorganic filler, an inorganic fiber, and an organic binder. In some embodiments, the inorganic filler is from 75 to 90 wt % of the gasket material and can include submicron-sized talc particles. The inorganic fiber can be from 5 to 20 wt % of the gasket material and can include silicic acid fiber. The binder can be a latex emulsion and can be present in the gasket material in the range of from 1 to 5 wt % of the gasket material. The gasket material also can include additives, such as flocculant and defoamer. In some embodiments, the amount of organic material present in the gasket material is limited to less than 5 wt % of the gasket material.

20 Claims, 5 Drawing Sheets

(51) Int. Cl.
    *B32B 27/00*     (2006.01)
    *H01M 4/92*      (2006.01)
    *H01M 4/86*      (2006.01)
    *H01M 8/1004*    (2016.01)
    *F16J 15/08*     (2006.01)
    *H01M 8/124*     (2016.01)
    *F16J 15/06*     (2006.01)

(52) U.S. Cl.
    CPC ........ *F16J 15/0806* (2013.01); *H01M 4/8605* (2013.01); *H01M 4/92* (2013.01); *H01M 4/926* (2013.01); *H01M 8/1004* (2013.01); *H01M 2008/1293* (2013.01); *Y02E 60/521* (2013.01); *Y02E 60/525* (2013.01)

(58) Field of Classification Search
    CPC .......... H01M 2008/1293; Y02E 60/525; Y02E 60/521; F16J 15/20; F16J 15/064; F16J 15/0806; B32B 27/00
    USPC ....... 429/490, 495, 442; 277/650; 428/423.5
    See application file for complete search history.

(56) References Cited

U.S. PATENT DOCUMENTS

| | | |
|---|---|---|
| 4,271,228 A | 6/1981 | Foster et al. |
| 4,317,575 A | 3/1982 | Cavicchio |
| 4,319,950 A | 3/1982 | Sznopek et al. |
| 4,423,544 A | 1/1984 | Kashmerick et al. |
| 4,508,777 A | 4/1985 | Yamamoto et al. |
| 4,629,634 A | 12/1986 | Coughlan et al. |
| 4,698,243 A | 10/1987 | Carl et al. |
| 4,705,278 A | 11/1987 | Locacius et al. |
| 4,748,075 A | 5/1988 | Beyer et al. |
| 4,759,962 A | 7/1988 | Buecken et al. |
| 4,786,670 A | 11/1988 | Tracy et al. |
| 4,795,174 A | 1/1989 | Whitlow |
| 4,834,279 A | 5/1989 | McDowell et al. |
| 4,859,526 A | 8/1989 | Potepan et al. |
| 4,894,128 A | 1/1990 | Beaver |
| 4,913,951 A | 4/1990 | Pitolaj |
| 4,961,991 A | 10/1990 | Howard |
| 4,990,544 A | 2/1991 | Asaumi et al. |
| 5,000,824 A | 3/1991 | Gale et al. |
| 5,106,790 A | 4/1992 | Hashimoto et al. |
| 5,240,766 A | 8/1993 | Foster |
| 5,272,198 A | 12/1993 | Kaminski et al. |
| 5,298,549 A | 3/1994 | Mecklenburg |
| 5,437,767 A | 8/1995 | Halout et al. |
| 5,472,995 A | 12/1995 | Kaminski et al. |
| 5,511,797 A | 4/1996 | Nikirk et al. |
| 5,527,599 A | 6/1996 | Hall et al. |
| 5,615,897 A | 4/1997 | Akita |
| 5,763,094 A * | 6/1998 | Amano et al. ............. 428/473.5 |
| 5,992,857 A | 11/1999 | Ueda et al. |
| 6,117,556 A | 9/2000 | Tamaru et al. |
| 6,398,224 B1 | 6/2002 | Erb et al. |
| 6,399,204 B1 | 6/2002 | Shekleton et al. |
| 6,505,839 B1 | 1/2003 | Toyosawa et al. |
| 6,550,782 B2 | 4/2003 | Okazaki et al. |
| 6,555,223 B2 | 4/2003 | Kubo |
| 6,746,626 B2 | 6/2004 | Hayward et al. |
| 7,056,250 B2 | 6/2006 | Burrowes et al. |
| 7,104,546 B2 | 9/2006 | Bono, Jr. |
| 7,229,516 B2 | 6/2007 | Busby et al. |
| 2002/0000696 A1 | 1/2002 | Okazaki et al. |
| 2002/0050692 A1 | 5/2002 | Nishimuro et al. |
| 2004/0137302 A1* | 7/2004 | Gilman et al. .................. 429/35 |
| 2006/0071431 A1 | 4/2006 | Corbett |
| 2006/0100374 A1 | 5/2006 | Hamada et al. |
| 2007/0014965 A1 | 1/2007 | Chodelka et al. |
| 2007/0018412 A1 | 1/2007 | Bono |
| 2009/0001672 A1 | 1/2009 | Takahashi et al. |
| 2009/0162672 A1* | 6/2009 | Dunn et al. .................. 428/446 |
| 2011/0287677 A1 | 11/2011 | McManus |
| 2011/0293878 A1 | 12/2011 | McManus |
| 2012/0068415 A1 | 3/2012 | Deluca et al. |

FOREIGN PATENT DOCUMENTS

| | | |
|---|---|---|
| EP | 0511256 B1 | 6/1994 |
| EP | 0511265 B1 | 6/1994 |
| EP | 0616003 A1 | 9/1994 |
| EP | 0440116 A2 | 5/2010 |
| GB | 2020759 A | 11/1979 |
| GB | 2468373 A | 9/2010 |
| JP | 03044489 A | 2/1991 |
| JP | 2009-024877 A | 2/2009 |
| WO | WO-9402760 A1 | 2/1994 |
| WO | WO 2010100469 A1 | 9/2010 |

OTHER PUBLICATIONS

International Search Report and Written Opinion dated Oct. 20, 2011 for Int. Appl. No. PCT/US2011/024892, 9 pp.

Interrnational Searching Authority; "Notification of Transmittal of the International Search Report and the Written Opinion of the International Searching Authority, or the Declaration", May 2, 2012.

International Search Report and Written Opinion for International Application No. PCT/US2013/060729, mailed Feb. 18, 2014; 8 pages.

Supplementary European Search Report and Search Opinion of European Patent Application No. 11783891.2, dated Jul. 10, 2014, 7 pages.

Extended European Search Report for Application No. EP 11 83 4847.3 dated Mar. 23, 2016 (26 pages).

European Examination Report for Application No. EP 11 783 891.2 dated Mar. 1 2016 (5 pages).

* cited by examiner

EXTREME TEMPERATURE GASKET AND METHOD OF MAKING THE SAME

BACKGROUND

Gasket materials capable of withstanding extreme temperatures (e.g., above 850° F.) are necessary in numerous applications, such as titanium dioxide manufacturing, fertilizer and ammonia manufacturing, incineration and cogeneration, solid oxide fuel cells, and concentrated solar power apparatus. However, many previously known gasket materials are not capable of suitably performing at such high temperatures. For example, when gasket materials include relatively high amounts of organic material, the organic material burns off at high temperatures and creates leak paths that undermine the sealing properties of the gasket. Additionally, many manufacturers of traditional high temperature gasket materials sacrifice filler quantity in favor of higher quantities of fiber in order to provide added structural stability to the gasket material. However, the fiber is not as good of a sealant as the filler material, and so again the sealing properties of the gasket material suffer.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a solid oxide fuel cell incorporating an extreme temperature gasket capable of withstanding temperatures in excess of 50° F. is provided. The solid oxide fuel cell can include an upper electrode, a lower electrode, and an extreme temperature gasket material disposed between the upper electrode and the lower electrode. The extreme temperature gasket generally includes an inorganic filler, an inorganic fiber, and an organic binder. In some embodiments, the inorganic filler is from 75 to 90 wt % of the gasket material and can include submicron-sized talc particles. The inorganic fiber can be from 5 to 20 wt % of the gasket material and can include silicic acid fiber. The binder can be a latex emulsion and can be present in the gasket material in the range of from 1 to 5 wt % of the gasket material. The gasket material also can include additives, such as flocculant and defoamer. In some embodiments, the amount of organic material present in the gasket material is limited to less than 5 wt % of the gasket material.

In some embodiments, a concentrating solar power apparatus incorporating an extreme temperature gasket capable of withstanding temperatures in excess of 805° F. is provided. The concentrating solar power apparatus can include a first highly oxidation resistant flange, a second highly oxidation resistant flange, and an extreme temperature gasket material disposed between the first highly oxidation resistant flange and the second highly oxidation resistant flange. The extreme temperature gasket generally includes an inorganic filler, an inorganic fiber, and an organic binder. In some embodiments, the inorganic filler is from 75 to 90 wt % of the gasket material and can include submicron-sized talc particles. The inorganic fiber can be from 5 to 20 wt % of the gasket material and can include silicic acid fiber. The binder can be a latex emulsion and can be present in the gasket material in the range of from 1 to 5 wt % of the gasket material. The gasket material also can include additives, such as flocculant and defoamer. In some embodiments, the amount of organic material present in the gasket material is limited to less than 5 wt % of the gasket material.

These and other aspects of the present system will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Figure 1:
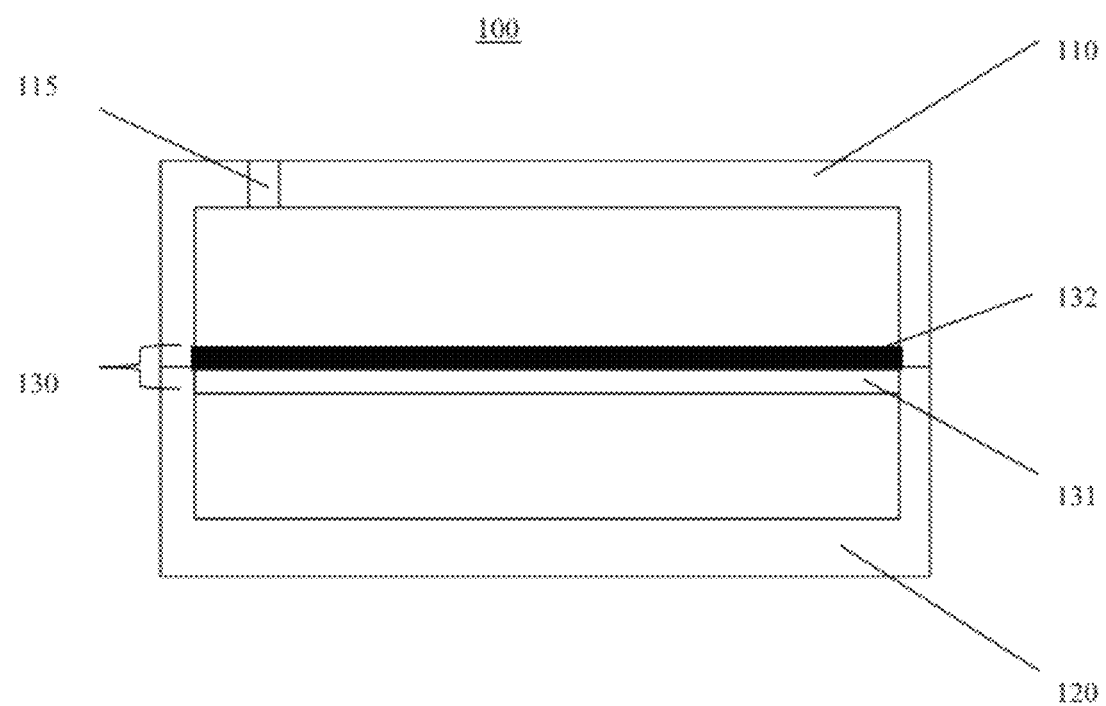
FIG. 1 is a cross-sectional view of a non-woven sheet former used in embodiments of methods for making extreme temperature gasket materials described herein.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense. Weight percentages provided herein are on a dry weight basis unless otherwise.

The extreme temperature gasket material generally includes 75 to 90 wt % inorganic filler, 5 to 20 wt % inorganic fiber, and 1 to 5 wt % organic binder. The extreme temperature gasket material is capable of withstanding temperatures in excess of 850° F. The gasket material can handle temperatures above 850° F. at least in part because of the use of inorganic fiber and inorganic filler and the minimization of the amount of organic binder used. In so doing, the extreme temperature gasket material minimizes the leak passages that tend to form in a gasket material when organic material burns off at extreme temperatures. The gasket material also has improved sealant properties due to high filler content (typically provided at the expense of the fiber content). The filler material is a better sealant than the fiber material, and accordingly, the extreme temperature gasket material described herein has improved sealing capabilities.

The inorganic filler material is present in the gasket material in the range of from 75 to 90 wt %. As noted above, this high filler content improves the sealing properties of the gasket material over previously known gasket materials having lower filler content. In some embodiments, the inorganic filler is a hydrophobic filler material. An exemplary hydrophobic filler material suitable for use in the extreme temperature gasket material described herein includes, but is not limited to, talc. Talc naturally repels water and provides for a better sealant, although the use of talc can also make forming the gasket material more difficult. Talc is also a useful filler material for the extreme temperature gasket material described herein because it is a platy filler that orients itself in thin layers during the gasket material forming process to thereby provide good sealant properties. The talc used an embodiments described herein is typically a mined inorganic material and not a synthetic material.

In some embodiments, the hydrophobic inorganic filler is the only filler present in the extreme temperature gasket material. In other embodiments, one or more hydrophilic fillers are used in conjunction with the hydrophobic filler. When hydrophillic fillers are used in conjunction with hydrophobic filler, it is preferable that the overall filler be substantially hydrophobic filler. Exemplary hydrophilic fillers that can be used with a hydrophobic filler include, but are not limited to, mica, fluorinated mica, vermiculite, and boron nitride. While the use of hydrophilic fillers can result in an easier process of making the gasket material, the hydrophilic nature of these inorganic fillers also means the resulting gasket material will have an affinity to water and therefore have inferior sealing properties to gasket material formed with only hydrophobic filter.

In some embodiments, the filler material is preferably low particle size filler, such as submicron-sized filler particles. In some embodiments, the particle size of the inorganic filler material is in the range of 0.2 microns to 1.5 microns. The low particle size fillers can help to produce gasket materials having very few voids. In some embodiments, the inorganic filler material has a specific gravity in the range of from 2.7 to 2.8 $g/cm^3$.

Providing an extreme temperature gasket material having inorganic filler in the range of from 75 to 90 wt % differentiates the extreme temperature gasket material disclosed herein from some previously known extreme temperature gasket materials. Applicants believe that including a high percentage of inorganic filler in a gasket material is generally counterintuitive to those of ordinary skill in the art. For example, the inclusion of higher amounts of filler in gasket materials is typically at the expense of the amount of fiber used in the gasket material. However, those skilled in the art of gasket materials tend to disfavor reducing the fiber content of gasket materials due to the associated decrease in gasket material tensile strength. Additionally, it is generally accepted by those of ordinary skill in the art that increasing the amount of filler will increase the difficulty of manufacturing specialty non-woven products in general and gasketing in particular. This can be especially true in gasket materials made using modified paper making processes. Additionally, when the filler material is a hydrophobic filler material, such as in the case of talc, the process of manufacturing the extreme temperature gasket material becomes more difficult as higher amounts of filler are used. As noted herein, the hydrophobic talc filler material is difficult to wet and turn into a slurry that can be processed into gasket sheet material. To avoid these processing difficulties, those of ordinary skill in the art have generally avoided using high amounts of hydrophobic filler material.

The inorganic fiber material is generally present in the gasket material in range of from 5 to 20 wt %. In some embodiments, the inorganic fiber material is a silicic acid fiber.

Examples of commercially available inorganic fibers that are suitable for use in the extreme temperature gasket material described herein include, but are not limited to, Nyad G, manufactured by Nyco Minerals of Willsboro, N.Y.; 3M Nextel Continuous Ceramic Oxide Fibers, manufactured by 3M of St. Paul, Minn.; and Insulfrax and Isofrax, manufactured by UniFrax of Niagra Falls, N.Y. The inorganic fiber can also be Wollastonite or Sepiolite. An Example of a commercially available silicic acid fibers that is suitable for use in the extreme temperature gasket material described herein includes, but is not limited to, Belcotex 225 SC 6 mm, manufactured by belChm of Freiburg, Germany.

In some embodiments, the inorganic fiber is preferably a fiber having no "shot," which is an undesirable non-fiber scrap byproduct produced during the manufacturing process of many ceramic fibers.

In some embodiments, the inorganic fiber material is in form of individual segments having small dimensions. The inorganic fiber material suitable for use in the gasket material described herein can have a length of from 1 to 6 mm, and a diameter of from 3 to 12 microns. Fibers segments having a length below this range will have an unsuitably low tensile strength and poor sealing properties. Fiber segments having a length above this range may have improved tensile strength, but the resulting gaskets may have unsatisfactory leak rates. Use of fibers having a diameter below the 3 to 12 micron range presents safety issues, such as allowing for inhalation of fibers.

Alternative inorganic fibers that can be used in the gasket material include refractory ceramic fibers (RCF) and alkaline earth silicates, RCFs include kaolin clay-based blends of alumina and silica with metal oxides and high purity blends of silica and alumina. An example of a commercially available RCF suitable for use in the gasket material described herein is Fiberfrax bulk fiber, manufactured by Unifrax of Niagra Falls, N.Y. Alkaline earth silicates, also known as high-temperature glass wools, include amorphous fibers that are produced by melting combinations of CaO—, MgO—, $SiO_2$, and $ZrO_2$. An example of a commercially available alkaline earth silicate suitable for use in the gasket material described herein is Superwool bulk fibers, manufactured by Thermal Ceramics of August, Ga.

The organic binder is generally present in the gasket material in the range of from 1 to 5 wt %. In some embodiments, the organic binder is latex. Exemplary latex emulsions suitable for use in the gasket material described herein include acrylics, nitrile elastomers, styrene butadiene rubber, ethylene vinyl acetate copolymers, and polyvinyldiene chloride. In some embodiments, nitrile elastomers are preferred. Suitable nitrile elastomers include nitrile butadiene rubber (NBR) or styrene butadiene rubber (SBR). An example of a commercially available nitrile elastomer suitable for use in the gasket material described herein is Nychem, manufactured by Emerald Performance Materials of Cuyahoga Falls, Ohio. An example of a commercially available NBR suitable for use in the gasket material described herein is Hycar 1572, manufactured by Lubrizol of Wickliffe, Ohio. An example of a commercially available SBR suitable for use in the gasket material described herein is GenFlo, manufactured by Omnova of Fairlawn, Ohio.

As noted above, the binder is an organic material, and the amount of organic material in the gasket material is limited to limit the burn off of organic material at extreme temperatures and the subsequent formation of leak paths. Accordingly, in some embodiments, the amount of organic material present in the gasket material is limited to no more than 5 wt %, and in some cases, no more than 3 wt %. While other previously known extreme temperature gasket materials have limited the amount of organic material in recognition of this same problem, Applicants are unaware of any extreme temperature gasket material that contains as low a quantity of organic material as in the extreme temperature gasket material disclosed herein.

The gasket material also can include additives to aid in the formation of the gasket material. In some embodiments, the gasket material further includes a flocculant. The flocculant aids in the formation of aggregates from individual particles. Flocculants generally include various molecular weight anionic, nonionic, or cationic polymers. The flocculants carry active groups with a charge that counterbalance the charge of the individual particles. Flocculants adsorb on particles and cause destabilization either by bridging or charge neutralization. In some embodiments, the flocculant used in the gasket material described herein is cationic because the binder and filler are anionic.

The flocculant used in the gasket material described herein can be from the polyacrylamide, polyethylene-imine, polyamides-amine, or polyamine group. In some embodiments, the preferred flocculant is a high molecular weight polyamine because the intrinsic flocculating power increases with molecular weight. An example of a commercially available flocculant suitable for use in the gasket material described herein is Superfloc, manufactured by Cytec of Woodland Park, N.J.

Another additive that can be included in the gasket material described herein is a defoamer. The defoamer is used to control foam formed after mixing together the binder, filler, and fibers but before the gasket material sheet is formed. Without a defoamer, an inconsistent gasket material sheet can form because the density of the slurry will not be consistent when foam is present. In some embodiments, the defoamer is a water-based emulsion defoamer. Examples of defoamers suitable for use in the gasket material described herein include DF-450 manufactured by Chemco of Ferndale, Wash., and Nalco 600096 ANTIFOAM manufactured by Nalco of Naperville, Ill.

The extreme temperature gasket material described above can be difficult to form due to the components used and the amount of certain components used. Accordingly, in some embodiments, a method for manufacturing the extreme temperature gasket material described above is provided. The method generally includes preparing a talc slurry, preparing a gasket sheet slurry using the talc slurry, forming a pre-densified gasket sheet from the gasket sheet slurry, and densifying the gasket sheet to form the extreme temperature gasket material.

The initial step of forming a talc slurry is carried out at least in part because the hydrophobic filler (e.g., talc) can be difficult to wet down. For example, if dry talc is added with the binder and fiber when preparing the gasket sheet slurry, the talc may not completely wet down in the gasket sheet slurry and may not be completely mixed into the gasket sheet slurry. By first preparing a talc slurry, the talc will then mix sufficiently with the binder and fiber when preparing the gasket sheet slurry.

Various parameters of the mixing step discussed below can be adjusted to prepare a talc slurry that is suitable for use in the method described herein. In some embodiments, certain parameters will require adjusting based on, for example, specific mixing equipment used. Examples of parameters that can be adjusted include: the shape and size of the mixing bowl; the number, shape and size of mixing blades; the number, shape, and size of baffles in the mixing bowl; mixing speeds; mixing times; mixer design (e.g., kettle, tumble, batch); and the amount of water used in the mixing step. Thus, specific details provided herein regarding parameters such as those listed above should be understood to be exemplary and capable of further modification and adjustment in order to prepare a suitable talc slurry.

In some embodiments, preparing the talc slurry generally includes adding the talc to water in stages and mixing the talc and water. For example, the total amount of talc required can be divided into two quantities, with the first quantity being added to a quantity of water and mixed for a period of time, followed by adding the second quantity of talc to the mixture formed from the first quantity of talc and water.

In some embodiments, talc is added to water while mixing, such as through the use of a mixing blade, is occurring. Thus, in the above example, the first quantity of talc is added to the water while a mixing blade mixes the water, and the second quantity of talc is added to the mixture formed from the water and first quantity of talc while a mixing blade mixes the mixture. While described as batch processing, the mixing may be conducted by feeding a continuous amount of talc at a rate sufficient to allow complete mixing.

The mixing of the water and talc can be carried out in any suitable mixing device, such as an industrial mixer. In some embodiments, a quantity of water is added to the mixing bowl of an industrial mixer, and the mixing blade is turned on. A first quantity of talc is then added into the mixing bowl while the mixing blade operates to mix the water and the talc being added into the mixing bowl. Mixing the first quantity of talc is carried out for a period of time, which may be for as little time as about 1 minute, followed by the addition of a further quantity of talc and further mixing. In some embodiments, the mixing is carried out at a reduced speed until all of the talc has been added, at which time the speed of the mixing is increased.

After the desired amount of talc is added to the water and mixing commences, additional steps may be taken to wet dry talc that adheres to the side of the mixing bowl or the mixing blade. In some embodiments, the mixing device includes a sprayer that is capable of spraying water at the sides of the mixing bowl and the mixing blade to wash off any dry talc adhered thereto and add the talc to the slurry forming in the mixing bowl. In some embodiments, these spraying steps occur while the mixing continues to take place. Multiple spraying steps can be carried out during the mixing process. For example, a first spraying step can occur after all of the talc has been added to the mixing bowl, followed by mixing for a period of time, such as 30 minutes to 1 hour, and then another spray step can be carried out before mixing the slurry for an additional period of time, such as 45 minutes to 90 minutes. In some embodiments, the speed of the mixing blade is reduced after the second spraying step, such that the mixing that occurs after the second spraying step is carried out a slower mixing speed then the mixing speed after the first spraying step. Notice the times provided herein should not be considered limiting, but rather, exemplary.

Generally speaking, the talc slurry formed in the above step will be from 10 to 40 wt % talc and from 60 to 90 wt % water. The entire mixing process can take place over a period of time ranging from 5 to 150 minutes, for example.

The longest periods of mixing take place between spray steps and after the final spray step. The mixing blade is generally started at half speed and increases from half speed to full speed after all of the talc has been added to the mixing bowl. The speed may then be reduced from full speed to half speed after the final spray step has occurred. Once the mixing has occurred and the talc slurry is formed, the mixing blade can be turned off and the talc slurry can be removed from the mixing device.

In other, less preferred, embodiments, a separate talc slurry is not prepared prior to introducing the fiber and binder into the slurry. Rather, the talc, fiber, and binder all mixed together at once with a quantity of water. In some embodiments, the slurry is from 97 to 99.8% water and from 0.2 to 3% solids material, with the solids material component of the slurry being from 85 to 95% talc, from 6 to 9% fiber, and from 2 to 5% binder. Advantages of preparing a single slurry of talc, fiber, and binder include only having to have one set of mixing equipment and less transfer equipment since there is no need to transfer talc slurry from one tank to another, while disadvantages include inconsistent mixing of the slurry (vigorous mixing is required to mix the hydrophobic talc, but also causes the fiber to clump).

In the next step of the process of making the extreme temperature gasket material, a gasket sheet slurry is formed using the talc slurry and the other components of the gasket material. Generally speaking, the gasket sheet slurry is formed by adding fiber to water and mixing for a period of time, adding the talc slurry to the mixture of water and fiber, adding the binder to the mixture, and optionally adding any additives, such as flocculant and defoamer. As noted above, adjustment of various mixing parameters can be carried out to ensure proper mixing.

The preparation of the gasket sheet slurry generally begins by mixing fiber and water. This step is performed first because the fiber disperses better in the water when no other solids (such as the binder) are present in the water. The mixing of the fiber and water can be carried out in a similar manner as the mixing of talc and water described above. An industrial mixer can be used, in which case the water is added to the mixing bowl, the mixing blade is started, and the fiber is mixed in with the water as the mixing blade operates. In some embodiments, the mixing blade will be operated at full speed (e.g., 40 Hz) when the fiber is added to the mixing bowl to mix with the water. The mixing of the fiber and water can take place for a relatively short period of time, such as for about 30 seconds to 10 minutes. The mixture of fiber and water generally includes from 0.01 to 5 wt % fiber and from 95 wt % to 99.99 wt % water. In some embodiments, the mixture is 0.03 wt % fiber and 99.97 wt % water.

In some embodiments, the mixing is temporarily stopped after the initial mixing of the fiber and water. This may be due to clumping of the fiber that occurs during the initial mixing step. Accordingly, the mixing can be stopped in order to declump the fiber. Any technique suitable for declumping the fiber can be used, such as use of water spray. After declumping has occurred, the mixing blade can be started again and run for an additional period of time. In some embodiments, the mixing is brought back up to full speed after recommencing mixing and the post-declumping mixing of the fiber and water is carried out for about 1 to 10 minutes.

Following the mixing of the fiber and water, the talc slurry is added to the mixture of fiber and water. The talc slurry is added to the mixture while mixing continues at full speed, although less than full mixing speed is possible. Once the talc slurry is added, the mixing may be carried out for about 3 to 20 minutes. In some embodiments, it may be useful to raise the level of the mixing blade after the talc slurry has been added.

In the next step, the binder is added to the mixture. Prior to adding the binder to the mixture, the speed of the mixing blade may be decreased to, for example, about half speed (e.g., 20 Hz). Generally speaking, the mixing blade speed should be reduced to 30 Hz or below. If mixing continues at full speed when the binder is added, or even at greater than about 30 Hz, the binder tends to foam up. Accordingly, slowing the speed of the mixing blade so that the binder is blended in to the mixture rather than mixed into the mixture can prevent foaming. In some embodiments, the mixture of water, fiber, talc slurry and binder is mixed for a relatively short period of time before adding the next component of the gasket sheet slurry, such as for about 10 to 90 seconds.

After the fiber, talc slurry, and binder have been added together to form a slurry, additives such as the flocculant and defoamer can be added into the slurry. The additives can be added in any order. In some embodiments, flocculant is added before defoamer. The additives are added while the mixing blade operates at half speed. A relatively short period of time follows the addition of each additive, such as 0.5 minutes of mixing following the addition of flocculant and 0.5 minutes of mixing following the addition of defoamer.

After the formation of the gasket sheet slurry, a pre-densified gasket sheet is formed from the gasket sheet slurry. The pre-densified sheet can be prepared using a non-woven sheet former specifically designed for forming sheets from the gasket sheet slurry described above. The non-woven sheet former can generally include three sections: an upper section, a filter media, and a lower section. The upper section and the lower section generally enclose the filter media, and in some embodiments the lower section is stationary while the upper section can be separated from the lower section to, for example, access the filter media. The overall shape and size of the non-woven sheet former is not limited, and can be varied based on the desired size and shape of the sheet to be formed by the non-woven sheet former. In some embodiments, the shape of the non-woven sheet former is generally rectangular to thereby form rectangular sheets.

FIG. 1 illustrates a cross-sectional view of the non-woven sheet former 100. The upper portion 110 and the lower portion 120 can cooperate to enclose the filter media 130, which is generally located in the middle of the enclosed space formed by the upper portion 110 and the lower portion 120. As noted above, the lower portion 120 can be stationary, while the upper portion 110 can be, for example, lifted up from the lower portion to gain access to the filter media 130.

The upper portion 110 can include an access port 115 that allows for the introduction of water and/or gasket sheet slurry into enclosed space between the upper portion 110 and the lower portion 120. In some embodiments, the access port 115 is in fluid communication with discharge valves in the mixing bowl used to form the gasket sheet slurry such that the gasket sheet slurry can be introduced into the non-woven sheet former 100 directly from the mixing bowl. As noted above, water can also be introduced into the non-woven sheet former 100 via the access port 115. In some embodiments, water is introduced into the non-woven sheet former 100 prior to adding gasket sheet slurry. The water, such as, for example, about 3 to 4 inches of water, can serve as a cushion for the slurry being pumped into the non-woven sheet former 100. Without the water cushion, fiber clumps can form when the slurry contacts the filter media 130. In some embodiments, the level of water in the non-woven sheet former 100 is higher than the filter media 130. The gasket sheet slurry can rest on top of the water, and as the water is drained out of the non-woven sheet former 100, the gasket sheet slurry lowers on top of the filter media 130.

The filter media 130 located in the enclosed space between the upper portion 110 and lower portion 120 can generally include a screen 131 and filter paper 132 positioned on top of the screen 131. The filter media 130 partitions the enclosed space into an upper portion and a lower portion. The slurry deposited into the non-woven sheet former 100 will rest on top of the filter paper 132 and screen 131, as the slurry is too thick to pass through. In some embodiments, the filter paper 132 remains with the pre-densified sheet formed in the non-woven sheet former 100 to provide additional structural support to the pre-densified sheet when it is removed from the non-woven sheet former 100. The mesh size of the filter media 130 can be selected to allow water to pass through the filter media 130 but to prevent the passage of the gasket sheet slurry through the filter media 130. The mesh size of the filter media 130 also can be selected to prevent the passage of both the filler and the fiber in the gasket sheet flurry through the filter media 130. If the mesh size of the filter media 130 is such that filler can pass through, the fiber content of the pre-densified sheet formed on the filter media will be too high.

The lower portion 120 of the non-woven sheet former 100 can be stationary and generally includes a drain and vacuum pump to pull water located in the upper portion of the enclosed space down through the filter media 130 and out of the non-woven sheet former 100. Removing the water through the drain and via the use of the vacuum pump results in the formation of the pre-densified gasket sheet.

Prior to removing water through the drain of the lower portion 120, the gasket sheet slurry deposited on the filter media 130 is dispersed evenly on the filter media 130. A disperser paddle can be used to accomplish this, and the result is an evenly distributed layer of gasket sheet slurry on the filter media 130. In some embodiments, the disperser paddle is a plunger. The gasket sheet slurry that is transferred into the non-woven sheet former 100 tends to enter into the non-woven sheet former 100 in a swirling manner. By plunging the plunger into the deposited slurry, the swirling action is stopped and the slurry disperses evenly on top of the filter media 130.

After the gasket sheet slurry is evenly dispersed in the non-woven sheet former 100, the drain in the lower section 120 is opened to begin the removal of water from inside the non-woven sheet former 100. Water above the filter media 130 is capable of passing through the filter media 130, and therefore opening the drain leads to water above the filter media 130 passing through the filter media 130 and out of the drain in the lower section 120 of the non-woven sheet former 100. In some embodiments, the drain is opened for a relatively short period of time to allow water to flow out of the lower section 120, such as for 0.5 minutes. Following draining of water, the vacuum pump can be turned on to further remove water from inside of the non-woven sheet former 100 and form the pre-densified sheet. In some embodiments, the vacuum pump is operated for about 4 minutes.

After water has been sufficiently removed from the non-woven sheet former 100 and the pre-densified sheet is formed, the pre-densified sheet can be removed from the non-woven sheet former 100. The upper portion 110 can be raised to allow for the pre-densified sheet to be removed. As noted above, the pre-densified sheet can be removed with the filter paper 131 still attached to the sheet in order to provide support to the pre-densified sheet.

Various characteristics of the pre-densified sheet formation step described above can be adjusted based on a variety of factors, such as the specific materials being used and prior processing steps. Examples of parts of the pre-densified sheet formation step that can be adjusted include, but are not limited to, the type of filter media used, the method of adding the slurry into the non-woven sheet former, the method of dispersing the slurry within the non-woven sheet former, and the amount of water removed from the non-woven sheet former prior to removing the pre-densified sheet.

A final step in the method of making the extreme temperature gasket material involves densifying the sheet. Densifying generally includes applying heat and pressure to the pre densified sheet. In some embodiments, a hydraulic press is used to densify the sheet. Heat can be applied in a range of from 300 to 400° F., and the pressure can be applied in a range of from 700 psi to 800 psi. The application of heat and pressure can be carried out for around 7 to 10 minutes, and the finished densified product can have a density in the range of from 85 to 95 ft/lb$^2$. In some embodiments, a release film is placed on the top and/or bottom of the sheet prior to densification. The release film can be, for example, PET coated with silicone. Densification can also be carried out via calendaring. Densification can be carried out on a continuous or batch basis.

In some embodiments, the process of manufacturing the extreme temperature gasket material is a continuous process, such a continuous wet lay process. The continuous wet lay process is similar to traditional paper making processes that use a Fourdrinier machine.

The continuous wet lat process can begin with the preparation of a gasket sheet slurry. The preparation of the gasket sleet slurry can be similar or identical to the gasket sheet slurry preparation steps described above in greater detail. In some embodiments, the gasket sheet slurry can be prepared by first preparing a talc slurry, followed by adding the fiber and binder to the talc slurry to produce the gasket sheet slurry. Alternatively, the talc, fiber, and binder and be mixed together at the same time with water to create the gasket sheet slurry.

In some embodiments, including those where the gasket sheet slurry is prepared as described in greater detail above, the gasket sheet slurry provided at the beginning of the continuous wet lay process will include from 2 to 5% solid material. In such embodiments, an initial step of diluting the gasket sheet slurry is carried out in order to reduce the solid content of the gasket sheet slurry to within the range of from 0.5 to 3%. Diluting the gasket sheet slurry can be performed by adding a further amount of water to the gasket sheet slurry. In some embodiments, this dilution step can take place in the headbox of a Fourdrinier machine. It is preferable to dilute the gasket sheet slurry to within this range of solid material because excessive solid content will result in gasketing material that is too wet and thick. It is also preferred not to dilute the gasket sheet slurry below 0.5% solid material because too high a water content will result in the gasketing material being thin and weak.

In a next step of the continuous wet lay process, the diluted gasket sheet slurry is continuously transferred onto a continuously running wire mesh conveyor belt. Any suitable manner of transferring the diluted gasket sheet slurry onto the wire mesh conveyor belt can be used, although it is preferable that the manner of transferring the diluted gasket sheet slurry provide for a generally uniform distribution of diluted gasket sheet slurry on to the wire mesh conveyor belt. In some embodiments, a Fourdrinier machine will include the appropriate mechanism for transferring the diluted gasket sheet slurry from the headbox to the wire mesh conveyor belt.

The mesh size of the wire mesh conveyor belt is a parameter of the process that can be adjusted to alter the characteristics of the gasketing material produced by the continuous wet lay process. In some embodiments, the mesh size of the wire mesh conveyor belt is in the range of from 24 to 32 (number of openings per square inch in both the vertical and horizontal direction). When the mesh size is larger, the slurry may be capable of falling through the conveyor belt. When the mesh size is smaller, the removal of water from the slum, in later processing steps may be inhibited.

The speed at which the conveyor belt travels is another parameter of the process that can be adjusted to alter the characteristics of the gasketing material produced by the continuous net lay process. In some embodiments, the conveyor belt is operated at a speed in the range of from 2 to 5 ft/min. Speeds outside of this range may remove excessive amounts of water from the slurry (such as when the speed is lower than this range), or may remove insufficient amounts of water from the slurry (such as when the speed is higher than this range).

The wire mesh conveyor belt travels over one or more suction boxes, which operate to pull water down and out of the diluted gasket sheet slurry being carried by the conveyor belt. Any suction boxes use a mild vacuum to pull the water down through the wire mesh conveyor belt. Any suitable number of suction boxes can be used, and the suction boxes can be located under the entire length of the conveyor belt.

After or while the conveyor belt exposes the diluted gasket sheet slurry to the suction boxes, the conveyor belt passes the gasket sheet slurry through a press section, which acts to remove additional water from the slurry while also flattening and smoothing the slurry. The press section can include one or more rollers through which the conveyor belt passes. When a Fourdrinier machine is used, the pressing can be accomplished with the use of a Dandy roll.

After a pressing step, the slurry is carried by the conveyor belt through a drying zone, which aims to reduce the water content of the slurry down to about 5%. The drying zone may include steam heated rollers. In some embodiments, the steam heated rollers are heated to a temperature of between 400 and 500° F.

After the pressing step, the slurry may be sufficiently dried and altered such that the gasket sheet material is formed. Various additional processing steps can be carried out to further finalize the formation of the gasket sheet material. Once such processing step is the calendaring of the material on the wire mesh conveyor belt. Calendaring can include passing the conveyor belt having the gasket sheet material disposed thereon through a series of rollers in order to smooth the material and provide the material with a more uniform thickness.

In some embodiments, the wire mesh conveyor described above is positioned at an incline of from 15 to 35° in order to improve the removal of water from the slurry. When the conveyor is positioned at an incline, the a portion of the water content of the slurry remains in behind while the slurry travels upward to be exposed to the various process steps described above, including drying via suction boxes and heated rollers and pressing the slurry material.

Some variations to the above described wet lay process can be made to accommodate for the special characteristics of the gasket sheet slurry. For example, the drainage steps can be increased, such as by increasing the vacuum pressures traditionally applied. In some embodiments, the wire mesh conveyor provides more support than is provided in traditional non-woven paper making processes due to the lower than normal wet tensile strength of the pre-densified sheets. Additionally, throughput dryers can be used in place of canister dryers. The throughput dryers can be preferable due to the lower than normal wet tensile strength of the pre-densified sheets.

In still other embodiments for manufacturing the extreme temperature gasket materials, a discreet method uses molds to form extreme temperature gaskets of various shapes and sizes. The discreet method can be similar to traditional pulp molding processes used in the paper making industry. The gasket sheet slurry described above can be sucked into fine-mesh screens having various shapes and configurations, followed by removing and drying the slurry shaped by the screens. In some embodiments, the gasket sheet slurry is slightly modified when a discreet method is used. For example, the latex binder can be substituted with a solvent-based elastomer.

Extrusion processing also can be used to manufacture the extreme tempera gasket material described herein. In such processes, traditional extrusion apparatus used in ceramics are used to force the gasket sheet slurry through a die and create shaped gasket material. As with the discreet methods, the latex binder in the gasket sheet slurry can be replaced with solvent-based elastomer when using an extrusion process to form the gasket material.

In some embodiments, the extreme temperature gasket material is made using a process similar or identical to a silk screen process. Generally speaking, the process involves providing the gasket sheet slurry (possibly in a thicker consistency) and spreading the gasket sheet slurry over a hole having a specified shape. The slurry will fill the shaped hole and can then be treated further to form a gasket having the shape of the hole.

In some embodiments, the extreme temperature gasket material is made using a process similar to injection molding processes. Discrete extreme temperature gasket material is made by preparing a paste instead of a slurry. Generally, a paste can be prepared by using less water in the slurry preparation steps described above. The paste is pushed into a heated barrel after which it is augured into a heated mold using a, e.g., screw-type plunger. Once the cavity of the mold is filled, the holding pressure is maintained to compensate for the evaporation of water.

In some embodiments, the extreme temperature gasket material is made from a compression molding process. In such a process, gasket sheet slurry is packed in the negative section of a die, heated in an oven, and then pressed at an elevated temperature and pressure using the positive section of the die. The result is extreme temperature gasket material having the shape of the die used in the compression molding process.

The slurry packed in the negative section of the die can be similar or identical to the gasket sheet slurry described in greater detail above, and can also be prepared according to the slurry preparation steps provided above. In some embodiments, the slurry is drained prior to being disposed in the negative section of the die. Draining the slurry can include placing the slurry on a mesh screen to allow water to drain down and out of the slurry for a period of time. Any mesh screen capable of allowing water but not the slurry to fall through the screen can be used.

The manner of disposing the slurry material into the negative section of the die is not limited, and can include either pouring the slurry into the die with no compression or packing steps, or pouring the slurry into the die followed by packing down the slurry and optionally adding additional slurry into the negative section of the die. In some embodiments, the amount of slurry disposed in the negative section of the die is an amount less than will fill the entire cavity of the negative section of the die.

Figure 5:
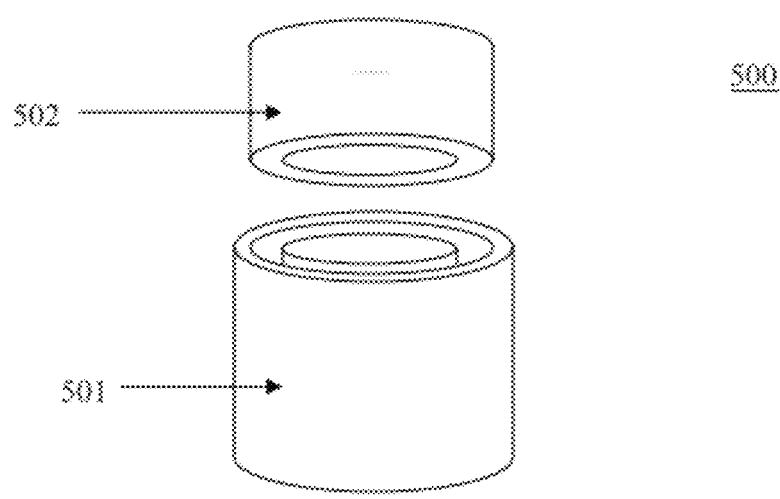
FIG. 5 is a perspective view of a die that can be used in a compression molding process for preparing extreme temperature gasket material according to embodiments described herein.

Any die suitable for use in compression molding of gasket material slurry can be used. The die can be made from, for example, stainless steel. The shape of the die is not limited, and can be selected based on the equipment with which the resulting gasket will be used. In some embodiments, the die will have an annular configuration to thereby produce ring shaped-gaskets. FIG. 5 illustrates an exemplary annular die 500, including both the negative section 501 and positive section 502 of the die 500. In the initial steps of the process, the gasket sheet slurry is disposed in the cavity of the negative section 501 of the die 500.

After the slurry is disposed in the negative section of the die, a heating step is carried out. The die can be an oven and exposed to elevated temperatures for a period of time, in some embodiments, the elevated temperature is in the range of from 200 to 250° F. (preferably 212° F.). In some embodiments, the die is in the oven for a period of from 1 to 3 hours (preferably 2 hours). The heating step works to further remove water from the slurry and move towards the creation of a gasket sheet material.

Following the heating step, the positive section of the die can be inserted into the negative section of the die to apply pressure on the gasket material inside the negative section of the die. As shown in FIG. 5, the positive section 502 of the die 500 generally mates with the cavity of the negative section 501 of the die 500 so that the positive section 501 can be inserted into the negative section 502. The pressure applied by the positive section can be in the range of from 700 to 900 psi (preferably 750 psi). Elevated temperatures can also be applied during this step, including by providing heat through the positive section 502 of the die 500. In some embodiments, the application of pressure is carried out at temperatures in the range of from 250 to 350° F. (preferably 300° F.).

Following the application of pressure and heat, an extreme temperature gasket material in the shape of the die will be formed. The gasket will have a density that is about double the density of the pre-molded material. The gasket can be removed from the die and subjected to any final processing steps, such as further shaping or smoothing of the gasket material.

Extreme temperature gaskets as described herein can be useful in various industrial and/or commercial applications, in one example, the extreme temperature gaskets described herein are used in solid oxide fuel cells. Currently, gasket materials used in solid oxide fuel cells are considered insufficient for dealing with the high temperatures encountered in solid oxide fuel cells. Too frequently, the gasket material fails at high temperatures. Despite this known problem with existing extreme temperature gaskets, no known solution has yet been provided. Solid oxide fuel cells generally require gaskets that are compressible, oxidation resistant, electrically isolating, sulphur free, low in organic content, capable of withstanding temperatures within the range of 500 to 1,000° C., and capable of affecting a seal at low loads (e.g., 100 to 800 psi). The extreme temperature gasket described herein can have some or all of these characteristics, including the ability to provide effective sealing at temperatures where previously known gasket materials used in the industry tend to fail, and is therefore suitable for use in solid oxide fuel cells.

Solid oxide fuel cells generally use a hard, non-porous ceramic compound as the electrolyte. Because the electrolyte is a solid, the cells do not have to be constructed in the plate-like configuration typical of other fuel cell types. Solid oxide fuel cells are expected to be around 50%-60% efficient at converting fuel to electricity. In applications designed to capture and utilize the system's waste heat (co-generation), overall fuel use efficiencies could top 80%-85%.

Solid oxide fuel cells operate at very high temperatures—around 1,000° C. (1,830° F.). High-temperature operation removes the need for precious-metal catalyst, thereby reducing cost. It also allows solid oxide fuel cells to reform fuels internally, which enables the use of a variety of fuels and reduces the cost associated with adding a reformer to the system.

Solid oxide fuel cells are also the most sulfur-resistant fuel cell type; they can tolerate several orders of magnitude more of sulfur than other cell types. In addition, they are not poisoned by carbon monoxide (CO), which can even be used as fuel. This property allows Solid oxide fuel cells to use gases made from coal.

The high-temperature operation of solid oxide fuel cells has disadvantages. It results in a slow start up and requires significant thermal shielding to retain heat and protect personnel, which may be acceptable for utility applications but not for transportation and small portable applications. The high operating temperatures also place stringent durability requirements on materials, such as gasket material used in the solid oxide fuel cells.

Each solid oxide fuel cell unit is generally made up of solid oxide fuel cells stacked on top of each other. These stacks need to be sealed with gasketing material that will keep the fuel and air, the two inputs for the cell, separate and also electrically isolate the cells from each other. The extreme temperature gasket material described herein is suitable for use in the stacks because it will be able to withstand the extreme operating temperatures while also being electrically isolating. The gasketing material described herein can also be useful for auxiliary components of the solid oxide fuel cells, such as pipe or jointed connections.

Figure 2:
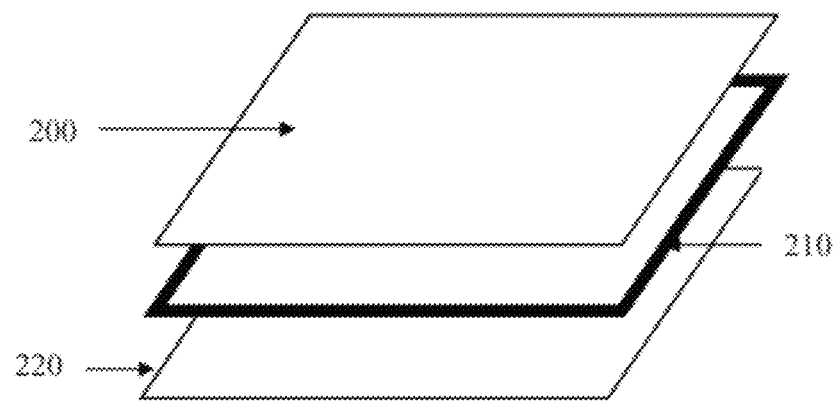
FIG. 2 is an exploded view of a solid oxide fuel cell having extreme temperature gasket material according to embodiments described herein incorporated therein.

FIG. 2 provides an illustration of a solid oxide fuel cell including a gasket made from extreme temperature gasket materials as described herein. Generally speaking, the solid oxide fuel cell includes an upper electrode 200 and a lower electrode 220. A gasket 210 made from the extreme temperature gasket material described in greater detail above is provided intermediate the upper electrode 200 and the lower electrode 220 of the solid oxide fuel cell. The gasket 210 has an open center and can have a shape and dimensions that are similar to identical to the shape and dimensions of the upper electrode 200 and the lower electrode so that the gasket 210 can be aligned with upper electrode 200 and the lower electrode 220 and create an enclosed area between the upper electrode 200 and the lower electrode 220.

In another example, the extreme temperature gasket material described herein can be suitable for use in concentrating solar power apparatus. Gasket materials currently used in concentrating solar apparatus tend to fail at the high operating temperatures of concentrating solar power apparatus, and also tend to be incapable of withstanding the corrosive materials used in concentrating solar apparatus, such as molten salts. Concentrating solar power apparatus require a gasket that is compressible, oxidation resistant, electrically isolating, low in organic content, capable of withstanding temperatures within the range of 500 to 1,000° C., and chemically resistant to heat transfer fluids such as molten salts, minerals, and synthetic oils. To date, no known solution exists to this longstanding problem. The extreme temperature gasket described herein can have some or all of these characteristics, including the ability to withstand high temperatures and corrosive materials, and is therefore suitable for use in concentrating solar power applications.

Concentrating solar power apparatus generally include solar power equipment that collects and concentrates the sun's energy. This can be done in a variety of ways, such as through the use of specially shaped and angled mirrors. Two main types of concentrating solar power apparatus include linear concentrator systems and power tower systems.

In the linear concentrator systems, the sun's energy is collected using long rectangular, curved (U-shaped) mirrors. The mirrors are tilted toward the sun, focusing sunlight on tubes (or receivers) that run the length of the mirrors. The reflected sunlight heats a fluid flowing through the tubes (such as molten salt compositions). The hot fluid then is used to boil water in a conventional steam-turbine generator to produce electricity.

There are two major types of linear concentrator systems: parabolic trough systems, where receiver tubes are positioned along the focal line of each parabolic mirror; and linear Fresnel reflector systems, where one receiver tube is positioned above several mirrors to allow the mirrors greater mobility in tracking the sun.

In a power tower system, a large field of flat, sun-tracking mirrors (known as heliostats) is used to focus and concentrate sunlight onto a receiver on the top of a tower. A heat-transfer fluid (such as molten salt compositions) heated in the receiver is used to generate steam, which, in turn, is used in a conventional turbine generator to produce electricity.

The molten salt compositions that can be used as the heat transfer fluid are beneficial because of superior heat-transfer and energy-storage capabilities. The energy-storage capability, or thermal storage, allows the system to continue to dispatch electricity during cloudy weather or at night. However, as noted above, this material high oxidizing and corrosive such that traditional gasket material can not be used to seal piping through which the heat transfer fluid flows. The extreme temperature gasket material described herein is capable of withstanding this material.

Thus, in some embodiments, the extreme temperature gasket material is used at any potential leak path in a concentrating solar power apparatus. Examples of leak paths in concentrating solar power apparatus where the extreme temperature gasket material can be used include, but are not limited to, man-ways and hand-holes on tanks and pressure vessels, components in rotating pump shaft seal systems (both packed sets and static gaskets in mechanical seals), body seals of a pump (i.e., for the casing, inlet flanges, and outlet flanges), flanged pipe joints, components in valve stem sealing sets, body seals of a valve (i.e. the bonnet, other body connections, inlet flanges, and outlet flanges), and steam turbines (i.e., casing, inlet flanges, and outlet flanges).

In some examples, the extreme temperature gasket material is used in the connections in the thermal storage systems, the receiver technology, and the heat transfer fluid transfer systems found in concentrating solar power apparatus. Typically the gasket material will be used in the flanged connections, manhole covers, and valves of the solar power apparatus.

Figure 3:
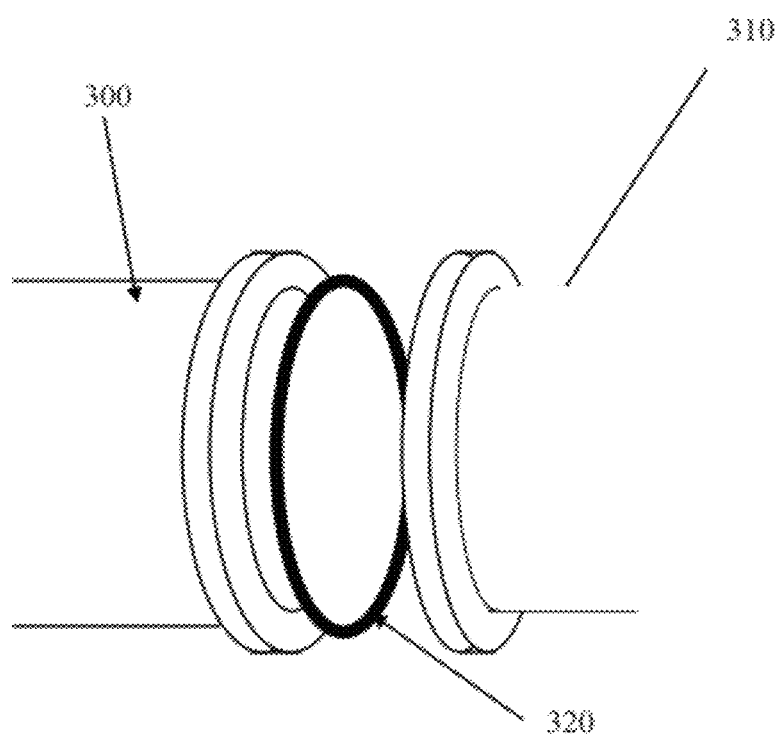
FIG. 3 is an exploded view of a flange of a concentrated solar power apparatus having extreme temperature gasket material according to embodiments described herein incorporated therein.

FIG. 3 provides an illustration of a concentrating solar power apparatus including extreme temperature gasket materials as described herein. Highly oxidation resistant piping 300 and 310 each have flanges that are mated to one another in order to connect the piping 300 and 310 and provide a path through which heat transfer fluid can flow. In order to effect a fluid tight seal between the flanges of piping 300 and 310, a gasket 320 made from the extreme temperature gasket material described herein is provided for positioning between the two flanges. The gasket 320 has an open center and can have a shape and dimensions that are similar or identical to the flanges of piping 300 and 310 so that the gasket 320 can be aligned with flanges and provide a fluid tight seal. Because the gasket 320 is made from the extreme temperature gasket material described herein, the gasket is capable of providing an effective seal despite the extreme temperature of heat transfer fluid used in the concentrating solar apparatus.

Figure 4:
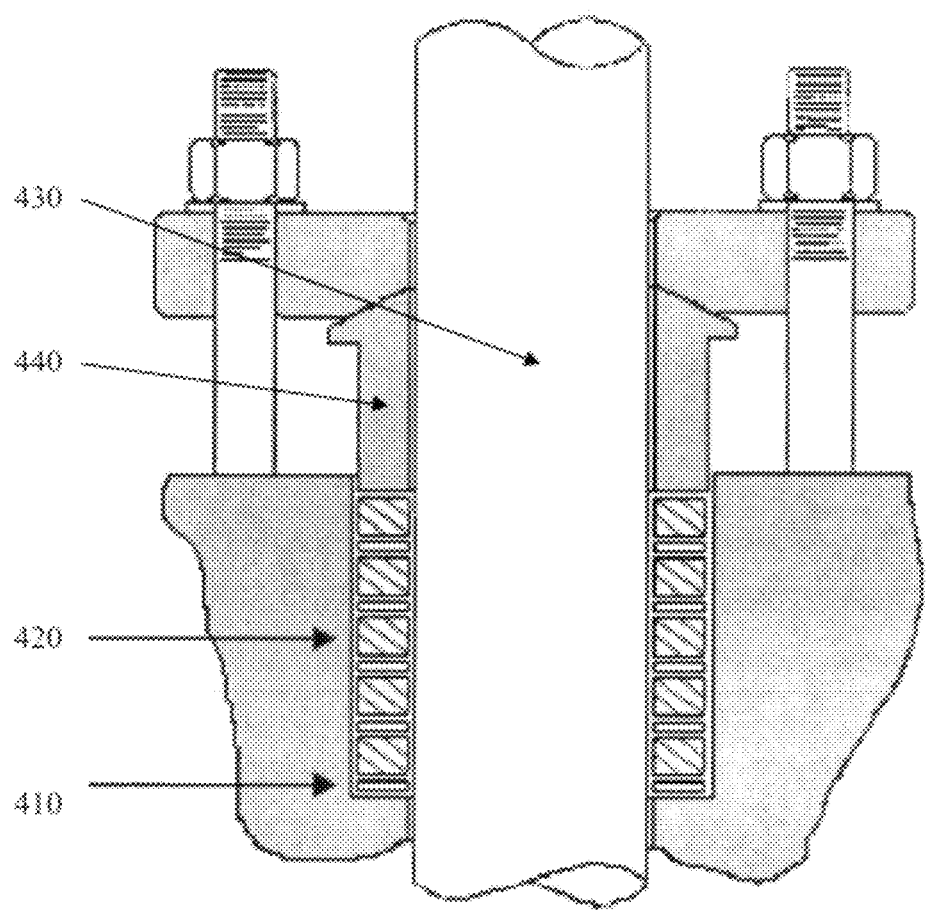
FIG. 4 is an exploded view of a valve stem packing set for a concentrated solar power apparatus having extreme temperature gasket material according to embodiments described herein incorporated therein.

FIG. 4 provides an illustration of a valve stem packing set 400 for concentrating solar power applications utilizing molten salts as a heat transfer fluid. The valve stem packing set 400 uses the extreme temperature gasket material described herein in the form of spacers 410. The extreme temperature gasket material spacers 410 are used together with low organic content compression packing rings 420 to achieve effective sealing.

The spacers 410 made from the extreme temperature gasket material protect the packing rings 420 from the media, more evenly transfer axial load from packing ring 420 to packing ring 420, and insulate the packing rings 420 from heat. Accordingly, the spacers 410 offer protection against chemical attack and heat exposure while also preventing the deposition of solids into the packing rings 420. Preventing deposition of solids into the packing rings 420 is desirable because the solids will crystallize, harden the packing rings 420, and render the packing rings 420 unresponsive to adjustment, ineffective in sealing, and abrasive to the stem 430.

The packing rings 420 are low organic content material, including for example, Garlock Style PBI 1200. The use of low organic content material is preferable to the use of graphite, which is easily oxidized by high temperature molten salts. As shown in FIG. 4, one configuration that can be used includes starting with temperature gasket material spacer 410 at the bottom, followed by a packing ring 420, and alternating between these two components until a packing ring 420 is at the top and in contact with a gland follower 440.

EXAMPLES

Example 1

Talc Slurry Forming Process

| TALC SLURRY MIXING PROCEDURE | | |
| --- | --- | --- |
| STEP | DESCRIPTION | Time (min) |
| 1 | Measure and add water to mixer bowl and turn on mixing blade at ½ speed | |
| 2 | Add first quantity of talc and mix for | 1 |

TALC SLURRY MIXING PROCEDURE

| STEP | DESCRIPTION | Time (min) |
|---|---|---|
| 3 | Add second quantity of talc, increase mixing blade speed to full and mix for | 4 |
| 4 | Using the 1 gallon sprayer, rinse off the dry talc from the mixing blade shaft and inside of the mixer bowl and mix for | 30 |
| 5 | Using the 1 gallon sprayer, rinse off the dry talc from the mixing blade shaft and inside of the mixer bowl, reduce mixing blade speed to ½ speed and mix for | 45 |
| 6 | Pour any water left in the sprayer into the mixer bowl and mix for | 10 |
| 7 | Turn off mixing blade | |

Example 2

Gasket Sheet Slurry Forming Process

GASKET SHEET SLURRY MIXING PROCEDURE

| STEP | DESCRIPTION | Time (min) | Speed (Hz) |
|---|---|---|---|
| 1 | Add water to mixer bowl | | |
| 2 | Add Fiber to mixer bowl and mix for | 2.0 | 40 |
| 3 | Stop mixing blade and declump, then restart mixing blade and mix for | 3.0 | 40 |
| 4 | Add Talc Slurry, raise mixing blade and mix for | 7.0 | 40 |
| 5 | Add Binder and mix for | 0.5 | 20 |
| 6 | Add flocculant (6 drops) and mix for | 0.5 | 20 |
| 7 | Add Defoamer (7 drops) and mix for | 0.5 | 20 |

Unless otherwise indicated, all numbers or expressions, such as those expressing dimensions, physical characteristics, etc. used in the specification are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less 5.5 to 10, 2.34 to 3.56, and so forth) or any values from 1 to 10 (e.g., 3, 5.8, 9.9994, and so forth).

We claim:

1. A solid oxide fuel cell comprising:
an upper electrode;
a lower electrode; and
an extreme temperature gasket material disposed between the upper electrode and the lower electrode, the extreme temperature gasket material comprising:
5 to 20 wt % inorganic fiber;
75 to 90 wt % inorganic filler; and
1 to 5 wt % organic binder.

2. The solid oxide fuel cell as recited in claim 1, wherein the inorganic filler is substantially talc.

3. The solid oxide fuel cell as recited in claim 1, wherein the amount of organic material present in the extreme temperature gasket material is less than 5 wt %.

4. The solid oxide fuel cell as recited in claim 1, wherein the amount of organic material present in the extreme temperature gasket material is less than 3 wt %.

5. The solid oxide fuel cell as recited in claim 2, wherein the talc is a low particle size talc having a particle size in the range of from 0.2 microns to 1.5 microns.

6. The solid oxide fuel cell as recited in claim 1, wherein the inorganic filler consists essentially of talc.

7. The solid oxide fuel cell as recited in claim 1, wherein the inorganic fiber is a silicic acid fiber.

8. The solid oxide fuel cell as recited in claim 1, wherein the organic binder is latex.

9. The solid oxide fuel cell as recited in claim 1, further comprising a flocculant.

10. The solid oxide fuel cell as recited in claim 1, further comprising a defoamer.

11. The solid oxide fuel cell as recited in claim 1, wherein the inorganic filler consists essentially of a hydrophobic material.

12. An apparatus comprising:
a solid oxide fuel cell comprising
an upper electrode;
a lower electrode; and
an extreme temperature gasket material disposed between the upper electrode and the lower electrode, the extreme temperature gasket material comprising:
5 to 20 wt % inorganic fiber;
75 to 90 wt % inorganic filler, wherein a majority of the filler is talc; and
1 to 5 wt % organic binder.

13. The apparatus as recited in claim 12, wherein the inorganic filler consists essentially of talc.

14. The apparatus as recited in claim 12, wherein the organic binder is selected from the group of organic binders consisting of: acrylics, nitrile elastomers, styrene butadiene, rubber, ethylene vinyl acetate copolymers, or polyvinyldiene chloride.

15. The apparatus as recited in claim 14, wherein the organic binder is a nitrile elastomer and the nitrile elastomer is selected from the group of nitrile elastomers consisting of: nitrile butadiene rubber or styrene butadiene rubber.

16. The apparatus as recited in claim 12, wherein the organic binder present in the extreme temperature gasket material is less than 3 wt %.

17. The apparatus as recited in claim 12, wherein the extreme temperature gasket material is nonconductive.

18. The apparatus as recited in claim 12, wherein the extreme temperature gasket provides a seal at a load less than 800 pounds per square inch.

19. The apparatus as recited in claim 12, wherein the extreme temperature gasket provides a seal at a load between 100 to 800 pounds per square inch.

20. An apparatus comprising:
a plurality of solid oxide fuel cell, wherein each of the plurality of solid oxide fuel cells are stacked with an extreme temperature gasket separating each of the plurality of solid oxide fuel cells, the extreme temperature gasket material comprising:
5 to 20 wt % inorganic fiber;
75 to 90 wt % inorganic filler, wherein a majority of the filler is talc; and
1 to 5 wt % organic binder.

* * * * *